US007398796B2

(12) United States Patent
Hjorth et al.

(10) Patent No.: US 7,398,796 B2
(45) Date of Patent: Jul. 15, 2008

(54) VALVE ARRANGEMENT

(75) Inventors: Henrik Hjorth, Egernsund (DK); Jens Vester, Soenderborg (DK)

(73) Assignee: Sauer-Danfoss Aps, Nordborg (DK)

( * ) Notice: Subject to any disclaimer, the term of this patent is extended or adjusted under 35 U.S.C. 154(b) by 585 days.

(21) Appl. No.: 11/149,904

(22) Filed: Jun. 10, 2005

(65) Prior Publication Data

US 2005/0274419 A1 Dec. 15, 2005

(30) Foreign Application Priority Data

Jul. 14, 2004 (DE) ...................... 10 2004 028 437

(51) Int. Cl.
*F16K 11/37* (2006.01)
*F15B 13/06* (2006.01)

(52) U.S. Cl. ........................ 137/552; 137/554; 137/884

(58) Field of Classification Search ................ 137/552, 137/553, 554, 884
See application file for complete search history.

(56) References Cited

U.S. PATENT DOCUMENTS

| | | | | |
|---|---|---|---|---|
| 3,813,990 | A | 6/1974 | Coppola et al. | 91/1 |
| 4,535,681 | A | 8/1985 | Nakamura et al. | 91/527 |
| 4,757,943 | A * | 7/1988 | Sperling et al. | 137/884 |
| 5,617,898 | A * | 4/1997 | Nagai et al. | 137/884 |
| 5,699,830 | A * | 12/1997 | Hayashi et al. | 137/554 |
| 5,725,022 | A * | 3/1998 | Taka et al. | 137/884 |
| 5,819,783 | A * | 10/1998 | Blatt et al. | 137/554 |
| 6,065,494 | A * | 5/2000 | Thomsen et al. | 137/552 |
| 6,169,338 | B1 * | 1/2001 | Stoll et al. | 307/11 |
| 7,198,065 | B2 * | 4/2007 | Vester | 137/884 |
| 2006/0011240 | A1 * | 1/2006 | Berner et al. | 137/554 |

FOREIGN PATENT DOCUMENTS

DE 4324177 2/1994

OTHER PUBLICATIONS

Sauer Danfoss PVSK Module Technical Information for “PVSK Module with Integrated Diverter Valve and P-Disconnect Function” dated Jan. 2003, Rev. A, pp. 1-7 and Appendix.
Danfoss Hydraulics Catalogue for “Load-Independent Proportional Valve Type PVG 32” dated Dec. 1998, Book 8, Partition 2, pp. 1-40.

* cited by examiner

*Primary Examiner*—John Rivell
(74) *Attorney, Agent, or Firm*—McCormick, Paulding & Huber LLP

(57) ABSTRACT

The invention concerns a valve arrangement (1) with a high-pressure connection (P), a low-pressure connection (T), at least one control valve (2 to 5), which is accommodated in a control valve module and has at least one working connection (A, B) for a hydraulic consumer (7 to 10), and a safety valve (6), which is accommodated in a safety valve module, and which releases or blocks a passage between the high-pressure connection (P) and the control valves (2 to 5), the control valve module (2 to 5) and the safety valve module (6) being connected to one component group. It is endeavoured to provide a valve arrangement with a high safety level. For this purpose, it is ensured that each control valve (2 to 5, 2' to 5') has an error detection device (19), that the safety valve module (6) has a safety switch device (21) and that the component group has a connection (20) between the safety switch device (21) and the error detection device (19).

12 Claims, 2 Drawing Sheets

VALVE ARRANGEMENT

CROSS-REFERENCE TO RELATED APPLICATIONS

Applicant hereby claims foreign priority benefits under U.S.C. § 119 from German Patent Application No. 10 2004 028 437.7, filed on Jun. 14, 2004, the contents of which are incorporated by reference herein.

FIELD OF THE INVENTION

The invention concerns a valve arrangement and, more specifically, to a safety valve therefor.

BACKGROUND OF THE INVENTION

Certain valve arrangements are known from the company brochure Sauer-Danfoss "PVSK module with integrated diverter valve and P-disconned function", edition November 2002.

With machines and devices performing hydraulic functions, usually several consumers are present, each being controlled by a control valve. For example, in connection with a crane, there are several cylinders, which lift different sections of a jib, a rotary motor, with which the jib can be turned, and, if required, a further hydraulic function, with which a grab mounted at the end of the jib can be activated. Similar conditions exist with other devices with hydraulic functions, for example mobile working platforms, diggers, etc.

In this connection, the control valves are connected to a component group, which is supplied with pressurised hydraulic fluid via the high-pressure connection. The control valves can, for example, be proportional valves, which permits the flow of a predetermined volume flow of hydraulic fluid to the working connection and thus to the consumer in dependence of the position of a valve element.

The safety requirements in connection with the safety of devices and machines provided with hydraulic functions are relatively high. Particularly, it is endeavoured to avoid that people are hurt, when errors occur.

From the brochure mentioned above, it is therefore known to combine the control valves with a safety valve. This safety valve interrupts the supply of hydraulic fluid to the control valves, when no supply is desired. For example, the safety valve can be operated in such a manner that the control valves are cut off from the supply, when a vehicle, which is provided with the hydraulic functions, drives in a street. When, for example, this vehicle is equipped with a mobile crane, it is under no circumstances permitted to operate this crane during the drive.

SUMMARY OF THE INVENTION

The invention is based on the task of providing a valve arrangement with a high safety level.

This task is solved in that each control valve has an error detection device, that the safety valve module has a safety switch device and that the component group has a connection between the safety switch device and the error detection device.

In the case of an error in a control valve, this embodiment makes it possible to place the complete valve arrangement is a safe state, for example in that the safety valve blocks the supply of pressurised hydraulic fluid from the high-pressure connection to the control valves. This safety function is integrated in the valve arrangement, that is, a blocking of the valve arrangement does not require that firstly the error in the control valves is detected, and then transmitted via a cable to an external monitoring device, which again sends a signal back to the safety valve. On the contrary, the complete safety is integrated in the valve arrangement. Thus, the valve arrangement can initially be configured in the manner, which is desired for the connected consumer. Depending on the number of consumers to be connected, more or less modules can be combined. Usually, module housings are connected laterally by means of flanges. However, this is not necessarily required. Also embodiments, in which hydraulic pipes exist between modules, can be imagined. Such an embodiment is still considered to be a "component group". The complete valve arrangement with all control valve modules and the safety valve module can then be tested, not only with regard to operability, but also with regard to meeting the safety requirements. This test can be made by the manufacturer, so that in a manner of speaking the valve arrangement is autonomic. Thus, such a valve arrangement is completely independent of application. In principle, it does not matter at all, which components exist around the valve group, and also it does not matter, whether a crane, a working platform or a tractor is concerned. The safety lies in the valve arrangement itself. This also simplifies the work of approving authorities, as, when safety is concerned, these authorities only have to consider the valve arrangement, not however an external wiring of the valve arrangement. The connection between the control valves and the safety switch device of the safety valve module can have a relatively simple design. It merely has to ensure that in case of an error, an error signal reaches the safety switch device, which will activate the safety valve to block the connection between the high-pressure connection and the control valves. The safety switch device can also assume the task of a "control device" or a "controller". These devices can, however, also be provided separately from the safety switch device outside the valve arrangement. They are then connected with the valve arrangement via a signal path, for example, a CAN-bus.

Preferably, the connection has a connection that is led to the outside. Thus, the error signal can also be evaluated outside the valve arrangement, and, for example, stop or reduce the pressure of a pump, which supplies the valve arrangement.

Preferably, the connection is a signal transmission wire, which is looped through from one control valve to the other and to the safety valve. As stated above, the design of the connection can be relatively simple. It merely has to ensure that a signal, which is generated by an error detection device, reaches the safety valve, or rather, its safety switch device. This can be achieved with a simple, serial connection of the error detection device.

Preferably, a self-test device is provided, which tests the connection on the occurrence of a predetermined event. It is correct that immediately after the manufacturing and the function test carried through, it may be assumed that the valve arrangement including its safety function works satisfactorily. As, however, some hydraulic appliances are used in relatively rough working environments, for example in building sites, it is expedient to test the connection. This is the purpose of the self-test device, which does, in a simple case, for example, apply an electrical voltage on one end of the connection, and then tests if a corresponding voltage reaches the other end.

Preferably, the predetermined event is the beginning of a supply with electrical energy. In other words, the self-test is always performed, when the vehicle, the machine or the device is started.

It is also advantageous that the self-test device tests the error detection device and/or the safety switch device. In this case, it is ensured that the complete safety function works.

Preferably, the self-test device is located in the safety valve module. As the component group comprises only one safety valve module, but several control valve modules, it is expedient to provide it only once and then in the safety module.

Preferably, in the error-free case each control valve provides a test signal with additional information. Thus, it is possible to determine, if all control valves are truly error-free. Here, it is not necessary to recognise, in which control valve the error exists. As long as it is not guaranteed that all control valves work without errors, the safety valve will not release the supply of the control valves with pressurised hydraulic fluid.

It is preferred that the additional information is formed by a prolongation of an impulse. Via the connection, the self-test device sends an impulse to the first control valve. When the control valve recognises an error-free state, it prolongs this impulse by a predetermined length. Each control valve, which defines its state to be error-free, prolongs the impulse by a corresponding length. The safety switch device then merely has to check, if the returned impulse has the length, which corresponds to the number of control valves available. In this case, the safety valve is opened, so that it can supply the control valves with pressurised hydraulic fluid. When the impulse is too short, the safety valve remains or is closed.

Preferably, the connection is formed in a cable, which is led along the outside of the component group. This embodiment has several advantages. Firstly, an intervention in the module is not required to mount the cable. Secondly, it can relatively easily be seen from the outside, if the connection is in order, at least optically.

Preferably, the error detection device has a position sensor, which determines the position of a valve element, and a comparator, which compares the determined position with a desired value, a predetermined deviation causing the generation of an error signal. The desired value can, for example be defined by a signal, with which the control valve is controlled.

Preferably, the error detection device generates a neutral position signal, when the valve element is in its neutral position, and the safety valve closes the passage from the high-pressure connection to the control valves, when all valve elements are in the neutral position. In this case, it is ensured that the supply to the valve arrangement is interrupted, when such a supply is not required. This is an additional safety aspect.

BRIEF DESCRIPTION OF THE DRAWINGS

In the following, the invention is explained on the basis of preferred embodiments in connection with the drawings, showing.

DETAILED DESCRIPTION OF THE PREFERRED EMBODIMENTS

Figure 1:
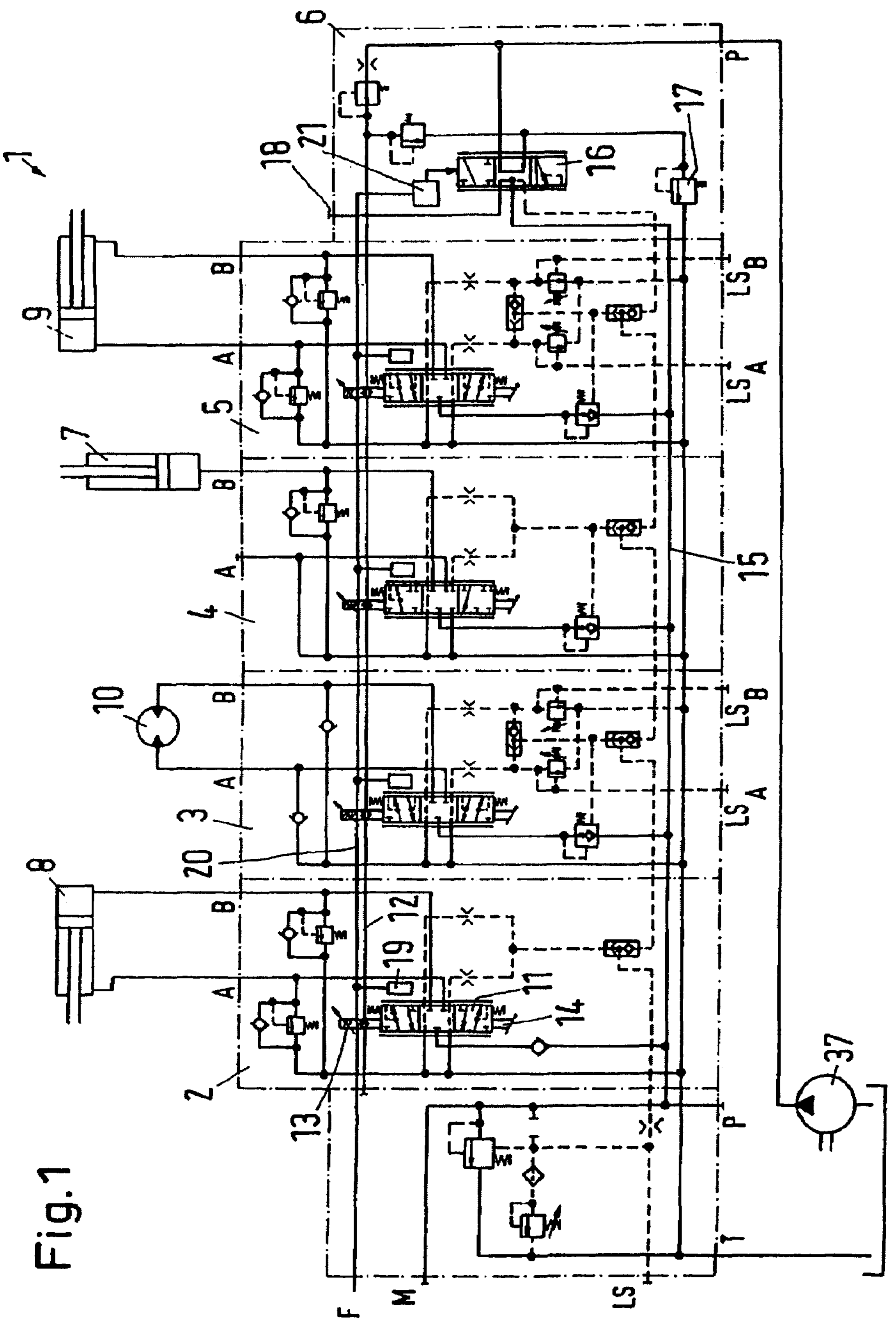
FIG. 1 is a schematic view of a valve arrangement in the form of a block diagram.

A valve arrangement 1 has a high-pressure connection P, a low-pressure connection T; several control valves 2 to 5 and a safety valve 6. Each control valve has two working connections A, B, to which hydraulic consumers are connected. The hydraulic consumers can have different designs. Examples are a single-acting cylinder 7, double-acting cylinders 8, 9 or a rotary motor 10. Of course, more than the four control valves 2 to 5 may be provided. The number of control valves 2 to 5 depends on the number of desired hydraulic functions.

All control valves 2 to 5 are proportional valves, having a valve element 11, which is supplied with a pilot pressure via a pilot pressure pipe 12. The pilot pressure of the pilot pressure pipe 12 is then led on to the valve element 11 via a solenoid valve arrangement 13 so that the valve element is displaced in one direction or the other. In many cases, the valve element 11 is a valve slide.

The valve element 11 can also be displaced by a mechanical handle 14, for example a lever.

The design of such a control valve 2 to 5 is known per se and is therefore not explained in detail. The design of such a valve appears from, for example, the catalogue "Load-independent proportional valve type PVG 32" of Danfoss Hydraulics, DK-6430 Nordborg, Denmark, edition December 1998. With regard to the design of the control valves, reference is made to the contents of this catalogue.

The control valves 2 to 5 are not connected directly with the pressure connection P, but with an auxiliary pressure pipe 15, which is led through the valve arrangement 1. The auxiliary pressure connection 15 is separated from the high-pressure connection P by the safety valve 6. This safety valve 6 has a valve element 16, which, in the neutral position shown, connects the high-pressure connection P with the low-pressure connection T, a pressure retaining valve 17 being located in this connection. Thus, in the neutral position shown, a connection from the high-pressure connection P to the control valves 2 to 5 is completely interrupted, that is, no pressurised hydraulic fluid reaches the control valves 2 to 5. Thus, the consumers 7 to 10 cannot be further activated. Under certain circumstances, they can be lowered to a safe position, when the valve elements 11 of the control valves 2 to 5 are activated accordingly. However, it is not possible to supply the consumers 7 to 10 with pressurised hydraulic fluid.

The safety valve 6 is in a state, in which the valve element 16 is displaced downwards (in relation to the view in FIG. 1). In this case, the high-pressure connection P is connected with the auxiliary pressure pipe 15 and the control valves 2 to 5 are practically supplied in the "normal operation". When the valve element 16 is displaced in the opposite direction, a pressure connection 18 is additionally connected with the high-pressure connection P.

Each control valve 2 to 5 has a position sensor 19, which detects the position of the valve element 11 and compares it with a desired value, which is supplied via a control cable, not shown in detail. The position sensors 19 are connected with a safety signal cable 20, which is connected with a safety switch device 21 in the safety valve 6. Instead of the virtual cable shown, also a wireless connection is possible, for example via radio, sound, light or the like. In principle, also a separate CAN-bus is possible.

When a position sensor 19 determines that the position of the valve element 11 deviates by more than a predetermined value from the desired position, this is regarded as an error and reported to the safety switch device 21. Of course also other criteria can be used for the occurrence of an error. The safety switch device 21 then activates the valve element 16 and moves it to the neutral position shown, in which the high-pressure connection P is separated from the control valves 2 to 5.

In a manner of speaking, the valve arrangement 1 is thus safe in itself, that is, it has an integrated safety function, with which it is not required that the error is first reported to a superior controller (for example a microcomputer) and from here back to the safety valve 6. On the contrary, the error control is autarchic, that is, the safety valve 6 is activated immediately, when an error occurs somewhere in the valve arrangement 1. It therefore no longer has to be considered that an error could occur in the communication from the valve arrangement 1 to a superior system and back. Thus, it is substantially simpler to calculate an error probability, which makes it much easier to get an approval from the authorities. The approval authorities then merely have to consider the valve arrangement 1, as in principle it does not matter, which components the valve arrangement 1, which can also be called "valve group", is controlling.

The safety signal cable 20 does not have to be led inside the valve arrangement 1. It can also be made as an external electrical wire, which is led along the outside of the valve arrangement 1, as shown schematically in FIG. 2.

Figure 2:
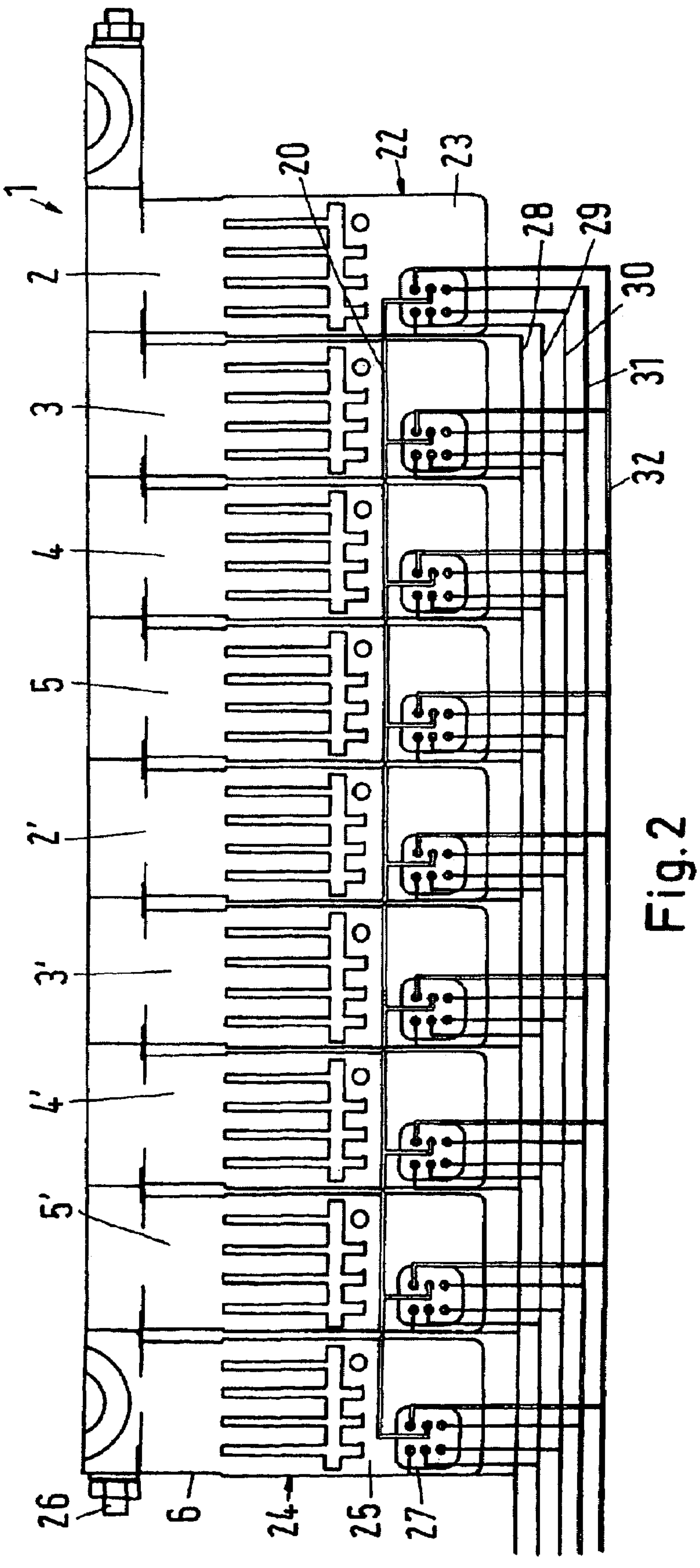
FIG. 2 is a rear view of a valve arrangement.

FIG. 2 shows the rear of a different valve arrangement 1 with the safety valve 6, the control valves 2 to 5 from FIG. 1 and additional control valves 2' to 5', which have been added. Each control valve 2 to 5, 2' to 5' are located in a control valve module 22, which has a control valve housing 23. The safety valve 6 is located in a safety valve module 24, which has a safety valve housing 25. The housings 23, 25 are arranged next to each other and connected with each other to a component group, for example by means of several through screw bolts 26.

The rear of the housing 23, 25 has uniform bushings 27, which are, in the present case, supplied with six electrical connections. Five of these connections serve the accommodation of a CAN-bus, which has five cables 28 (control voltage), 29 (mass), 30 (CAN-low), 31 (CAN-high) and 32 (supply voltage solenoid valves). The sixth bushing is connected with the safety signal cable 20, which can, as stated above, exist in the form of a looped through electrical cable. Physically, it can be integrated in the cable package forming the CAN-bus.

Figure 3:
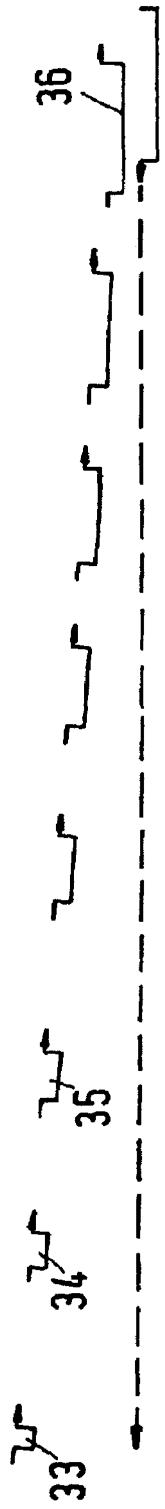
FIG. 3 is an example of a test signal.

The safety switch device 21 in the safety valve 6 has a self-test function, that is, it also forms a self-test device. Each time the supply voltage is switched on, the self-test device controls, for example via the cable 28 or via the cable 32, if the safety signal cable 20 is passable, that is, not interrupted. Additionally, it is checked, if the individual control valves 2 to 5, 2' to 5' are able to perform error monitoring. A simple method is shown in FIG. 3.

The safety valve 6, or rather, the safety switch device 21, sends an impulse 33 with the length l. The following control valve 5' receives this impulse and sends an impulse 34 with the length 2×l. The next control valve 4' acts similarly, as it receives the impulse 34 and sends a pulse 35 with the length 3×l. This process is repeated with all control valves 2 to 5, 2' to 5'. The last control valve 2 then generates an impulse 36 with the length 9×l, which is sent back to the safety valve 6. The safety valve 6 then merely has to check, if the impulse 36 actually has the length of 9×l. When the impulse 36 has a shorter length, then one of the control valves 2 to 5, 2' to 5' has not defined itself as error-free and accordingly has not prolonged the impulse. In this case, the safety valve 6 moves to or remains in the neutral position shown in FIG. 1.

In this state, it does in principle not matter, which of the control valves 2 to 5, 2' to 5' has caused the error. The only important thing is that the safety valve 6 detects that somewhere an error exists. In connection with an error, it shall not be able to operate the valve arrangement 1 in such a manner that dangerous situations occur.

The safety signal cable 20 has a connection F, which is led out of the valve arrangement 1. An error, which has occurred, can be reported through this connection. In this case, for example, a pump 37, which supplies the valve arrangement 1 with pressure, can work with a lower pressure or be turned off.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A valve arrangement with a high-pressure connection, a low-pressure connection, at least one control valve, which is accommodated in a control valve module and has at least one working connection for a hydraulic consumer, and a safety valve, which is accommodated in a safety valve module, and which releases or blocks a passage between the high-pressure connection and the control valves, the control valve module and the safety valve module being connected to one component group, wherein each control valve has an error detection device, that the safety valve module has a safety switch device and that the component group has a connection between the safety switch device and the error detection device.

2. The valve arrangement according to claim 1, wherein the connection has a connection (F) that is led to the outside.

3. The valve arrangement according to claim 1, wherein the connection is a signal transmission wire, which is looped through from one control valve to the other and to the safety valve.

4. The valve arrangement according to claim 1, wherein a self-test device is provided, which tests the connection on the occurrence of a predetermined event.

5. The valve arrangement according to claim 4, wherein the predetermined event is the beginning of a supply with electrical energy.

6. The valve arrangement according to claim 4, wherein the self-test device tests the error detection device and/or the safety switch device.

7. The valve arrangement according to claim 4, wherein the self-test device is located in the safety valve module.

8. The valve arrangement according to claim 4, wherein in the error-free case each control valve provides a test signal with additional information.

9. The valve arrangement according to claim 8, wherein the additional information is formed by a prolongation of an impulse.

10. The valve arrangement according to claim 1, wherein the connection is formed in a cable, which is led along the outside of the component group.

11. The valve arrangement according to claim 1, wherein the error detection device has a position sensor, which determines the position of a valve element, and a comparator, which compares the determined position with a desired value, a predetermined deviation causing the generation of an error signal.

12. The valve arrangement according to claim 11, wherein the error detection device generates a neutral position signal, when the valve element is in its neutral position, and the safety valve doses the passage from the high-pressure connection (P) to the control valves, when all valve elements are in the neutral position.

* * * * *